United States Patent [19]

Miyazaki et al.

[11] Patent Number: 5,258,840

[45] Date of Patent: Nov. 2, 1993

[54] APPARATUS FOR GENERATING TELEVISION RASTER DISTORTION CORRECTION SIGNALS BY MATHEMATICAL CALCULATIONS USING HORIZONTAL SYNC SIGNALS

[75] Inventors: Shinichirou Miyazaki, Kanagawa; Kyoichi Murakami, both of Kanagawa; Takahiko Tamura, Tokyo; Hiroshi Murayama, Kanagawa, all of Japan

[73] Assignee: Sony Corporation, Tokyo, Japan

[21] Appl. No.: 848,225

[22] Filed: Mar. 9, 1992

[30] Foreign Application Priority Data

Mar. 12, 1991 [JP] Japan .................................. 3-046854

[51] Int. Cl.$^5$ .............................................. H04N 5/04
[52] U.S. Cl. ..................... 358/148; 358/167; 358/154
[58] Field of Search ............... 358/162, 158, 159, 148, 358/149, 154, 167, 36

[56] References Cited

U.S. PATENT DOCUMENTS

| | | | |
|---|---|---|---|
| 4,110,789 | 8/1978 | Maly | 358/148 |
| 4,578,705 | 3/1986 | Elmis et al. | 358/148 |
| 4,803,407 | 2/1989 | Mehrgardt | 358/158 |
| 4,926,361 | 5/1990 | Ohtsubo et al. | 358/167 |
| 5,162,910 | 11/1992 | Willis | 358/158 |

FOREIGN PATENT DOCUMENTS 0346856 12/1989 European Pat. Off. .
0171368 7/1989 Japan .

Primary Examiner—Victor R. Kostak
Assistant Examiner—Jeffrey S. Murrell
Attorney, Agent, or Firm—Lewis H. Eslinger; Jay H. Maioli

[57] ABSTRACT

A correction signal generating circuit for a television receiver includes a counter for counting a pulse synchronized with a horizontal sync signal, a memory for storing correction data and a coefficient, and a unit for multiplying and adding contents of the counter and the memory. A signal feedback loop supplies an output from the multiplying and adding unit to an input thereof, and a control unit controls operation of the memory and the multiplying and adding unit, thereby generating a correction signal.

3 Claims, 2 Drawing Sheets

APPARATUS FOR GENERATING TELEVISION RASTER DISTORTION CORRECTION SIGNALS BY MATHEMATICAL CALCULATIONS USING HORIZONTAL SYNC SIGNALS

BACKGROUND OF THE INVENTION

1. Field of the Invention

The present invention generally relates to correction signal generating circuits and, more particularly, is directed to a raster distortion correcting signal generating circuit suitable for use in a television receiver or the like.

2. Description of the Prior Art

As a correction signal generating circuit used in a television receiver or the like, an apparatus has been proposed which generates a correcting signal such as a sawtooth wave signal or a parabolic wave signal or the like in accordance with a count value of a horizontal synchronizing (sync.) signal. However, the proposed conventional correcting signal generating circuit is constituted by analog circuits, so-called hard logics, and digital adder-subtracters.

The demand for limiting distortion has increased with the tendency of flattening and enlarging a cathode ray tube (CRT), so that a high-order deflection correcting signal has been required. However, it has been difficult to obtain sufficient accuracy when the high-order deflection correcting signal is generated by a conventional correcting signal generating circuit employing the analog circuits and digital adder-subtracters.

Further, in producing a so-called multistandardized television receiver in which the conventional correcting signal generating circuit employing the analog circuits and digital adder-subtracters is used, it is required to arrange the circuit configurations for every system or receiver. In this case, since it is further required to hold a parameter required for the adjustment for every system, a memory or the like for storing the parameter is additionally required. There is then the problem that the circuit configurations become larger.

OBJECTS AND SUMMARY OF THE INVENTION

Therefore, it is an object of the present invention to provide an improved correction signal generating circuit in which the aforementioned shortcomings and disadvantages encountered with the prior art can be eliminated.

More specifically, it is an object of the present invention to provide a correction signal generating circuit which can be multistandardized or can obtain various high-order deflection correcting signals according to the requirement for flattening and enlarging a CRT without enlarging the circuit.

As an aspect of the present invention, a correction signal generating circuit for a television receiver is provided which comprises of a counter for counting a pulse synchronized with a horizontal sync. signal, a memory for storing correction datum and coefficient, a unit for multiplying and adding contents of the counter and the memory, a signal feedback loop for supplying an output from the multiplying and adding unit to an input thereof, and a control unit for controlling operation of the memory and the multiplying and adding unit, thereby generating a correction signal.

As another aspect of the present invention, a correction signal generating circuit is provided which comprises a single multiplier, a single adder, a memory for storing data and a coefficient, and a controller for controlling the operations of the multiplier, adder and memory, wherein a calculation utilizing a set of the multiplier and the adder on the basis of a count value of a horizontal sync. signal per one field and contents of the memory is performed repeatedly to obtain desired deflection distortion correcting signals of high orders such as a sawtooth wave signal represented by $[Y_{SAW}=(CX^3+DX^2+X)B+A]$ and a parabolic wave signal represented by $[Y_{PARA}=(GX^4+X^2+HX)FB^2+E]$.

According to the thus constructed correction signal generating circuit of the present invention, since a desired correction signal based on the count value can be obtained through software processing such that the calculation utilizing a set of the multiplier and the adder is performed repeatedly, correction signals of various kinds of desired high order formulas can be obtained with simplified circuit configurations.

The preceding and other objects, features, and advantages of the present invention will become apparent from the following detailed description of an illustrative embodiment thereof when read in conjunction with the accompanying drawings.

DESCRIPTION OF THE PREFERRED EMBODIMENT

An embodiment of a correction signal generating circuit according to the present invention will be described with reference to FIGS. 1 to 3.

Figure 1:
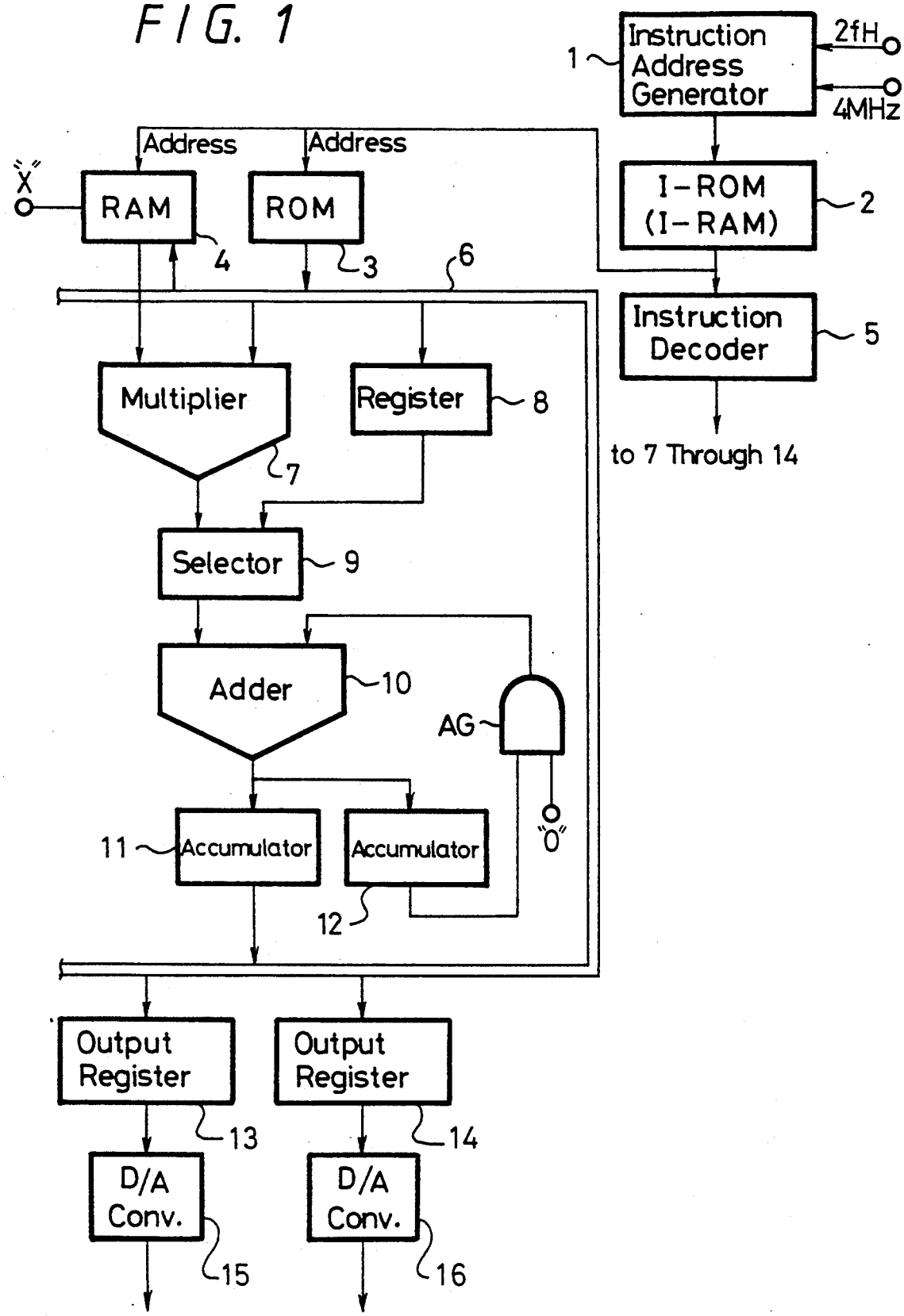
FIG. 1 shows in block form an arrangement of a main portion of an embodiment of a correction signal generating circuit according to the present invention.
Figure 2:
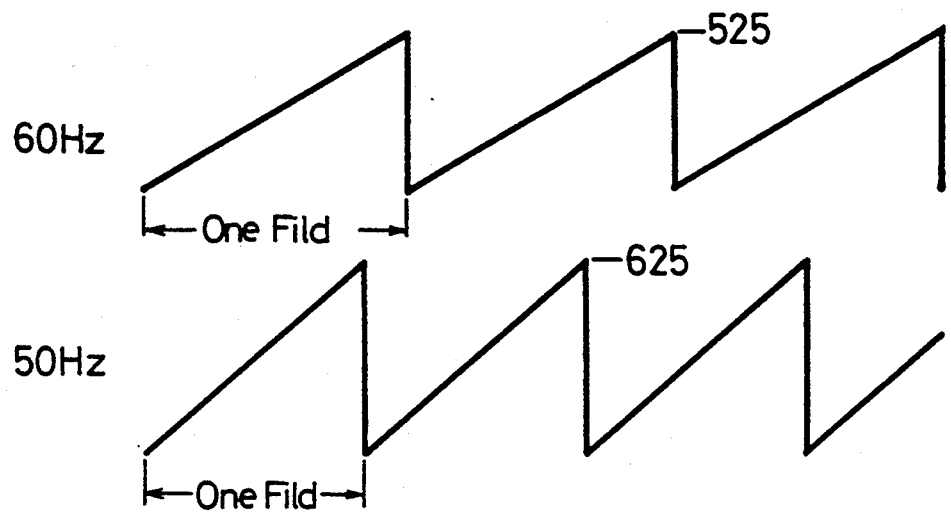
FIGS. 2A show waveform diagrams used to explain the operation of the arrangement of FIG. 1.

FIG. 1 shows in block diagram an arrangement of a main portion of an embodiment of a correction signal generating circuit according to the present invention.

Referring to FIG. 1, an instruction address generator 1 is supplied with a timing signal whose frequency ($2f_H$) is, for example, twice that ($f_H$) of a horizontal sync. signal and a clock signal with a frequency of 4MHz. A value generated by the instruction address generator 1 is supplied to an instruction read only memory (I-ROM) and instruction random access memory (I-RAM) 2 which in turn supplies its output to an instruction decoder 5 and an address input of each of a ROM 3 for storing data and a RAM 4.

An output of the ROM 3 is supplied to a multiplier 7 and a register 8 through a bus line 6. An output of the RAM 4 is also supplied to the multiplier 7. Outputs of the multiplier 7 and the register 8 are selectively supplied to one input of an adder 10 through a selector 9. An output of the adder 10 is then supplied to first and second accumulators (ACCs) 11 and 12. An output of the accumulator 12 is supplied to the other input of the adder 10 through an AND gate AG, while an output of the accumulator 11 is supplied to the multiplier 7, register 8 and RAM 4 through the bus line 6. The output of the accumulator 11 is also supplied to first and second output registers 13 and 14 through the bus line 6.

Each operation of the multiplier 7, register 8, selector 9, adder 10, accumulators 11, 12 and output registers 13, 14 is controlled in accordance with an output signal from the instruction decoder 5.

When a count value X obtained by counting per one field the timing signal of the frequency $2f_H$, for example, is supplied to the thus constructed correction signal generating circuit, the correction signal generating circuit can deliver correction wave signals of desired high-order formulas, e.g., a sawtooth wave signal synchronized with a vertical sync. signal and having a desired inclination angle represented by a formula $[Y_{SAW}=(CX^3+DX^2+X) B+A]$ and a parabolic wave signal required in a pincushion distortion correcting circuit or the like and represented by a formula $[Y_{PARA}=(GX^4+X^2+HX) FB^2+E]$. In these formulas, A, B, C, D, E, F, G and H represent parameters of vertical shift, vertical size, S correction, linearlity, horizontal size, pin amplification, pin phase and corner pin, respectively. The correction wave signals are delivered in a manner such that instantaneous values ($Y_{SAW}$, $Y_{PARA}$) of the sawtooth and parabolic wave signals at every horizontal sync. signal are delivered to the output registers 13 and 14, from which output signals are supplied to an output amplifier of a deflection distortion correction circuit of a horizontal deflection circuit (not shown) etc. through digital-to-analog (D/A) converters 15 and 16, respectively.

Values of the above-described correction wave signals can be calculated in the following manner, for example. Table 1 shows an example of program lists for performing the calculation of the sawtooth wave signal represented by a formula $[Y_{SAW}=(CX^3+DX^2+X) B+A]$ by the circuit arrangement of FIG. 1.

TABLE 1

| a | b | c | d | e | f | g | h |
|---|---|---|---|---|---|---|---|
| 79 | L | K > Y | Z + L = . | — | R | 0D | M |
| 7a | L | K > Y | Z + R = . | — | R | 14 | M |
| 7b | M | — > — | Z + R = H | B | — | 12 | M |
| 7c | M | — > — | A + B = . | A | — | 12 | M |
| 7d | L | K > Y | A + L = . | — | R | 16 | O |
| 7e | M | — > — | Z + R = H | A | — | 0D | L |
| 7f | M | — > — | A + B = H | B | — | 0D | M |
| 80 | M | — > — | A + B = . | A | — | 0D | M |
| 81 | L | K > Y | A + L = . | — | R | 00 | O |
| 82 | M | — > — | Z + R = H | A | — | 0D | L |
| 83 | M | — > — | Z + B = H | B | — | 0D | M |
| 84 | M | — > — | A + B = . | A | — | 0D | M |
| 85 | L | K > Y | A + L = . | — | R | 11 | M |
| 86 | M | — > — | A + B = H | B | — | 10 | M |
| 87 | M | — > — | A + B = H | B | — | 10 | M |
| 88 | M | — > — | A + B = . | A | — | 10 | M |
| 89 | L | K > Y | A + L = . | — | R | 00 | O |
| 8a | L | X > Y | Z + L = . | A | 1 | 00 | M |

The calculation of the sawtooth wave signal is performed on the basis of this table 1 by repeating a set of multiplication and addition four times, as follows $$Y_{SAW}=(((CX+D) X+1) X+0) B+A$$

This calculation is performed with accuracy of 16 bits in view of a fact that the multiplier 7 has an ability of 8×8 bits.

In the table 1, a column a represents addresses of the instruction ROM and RAM 2, and the calculations are executed in accordance with the order of the addresses. A column b represents kinds of instructions, wherein M, L and J represent multiplication, load and jump instructions, respectively. A column c represents kinds of load instructions, wherein K>Y represents the load of data between the memory and the register and X>Y represents the load of data between the registers. A column d represents calculation formulas performed by the adder 10. A column e represents the register for X where A represents upper 8 bits of the accumulators 11, 12 and B represents lower 8 bits thereof. The column e, upon the multiplication instruction, represents the register for multiplication. A column f represents a kind of the register Y, wherein R, 1 and 2 represent the register 8 and output registers 13 and 14, respectively. A column g represents addresses of the ROM 3 and RAM 4. The column g represents addresses of multiplication coefficients upon the multiplication instruction. A column h represents selected memories (ROM, RAM).

The calculation of the values of the sawtooth signal is performed on the basis of this program list as follows.

Firstly, on the basis of the program at an address 79 of the I-ROM (I-RAM) 2, a value is loaded to the register 8 from an area of an address 0D of the RAM 4 in which the value X is previously stored.

Then, on the basis of the process at an address 7a, a value is loaded to the register 8 from an area of an address 14 of the RAM 4 at which a coefficient of the linearlity D is previously stored, and also a sum of 0 and the value of the register 8 is obtained by the adder 10. A result of the sum is supplied to the accumulator 11.

In accordance with the process at an address 7b, the multiplication of the lower 8 bits of the accumulator 11 and the content of an address 12 of the RAM 4 is performed by the multiplier 7, and also addition of 0 and the value of the register 8 is performed in parallel. A result of the sum is supplied to the accumulator 12. The accumulator 11 holds the previous result of the sum. Now, the RAM 4 stores a coefficient C of the S correction at the address 12. Thus, the process at the address 7b performs a sum of product CX (lower bits) and (0+D) to obtain CX (lower bits)+D.

Then, on the basis of the process at an address 7c, the multiplication of the upper 8 bits of the accumulator 11 and the content of the address 12 of the RAM 4 is performed by the multiplier 7. Further, in parallel with this multiplication, the value D of the accumulator 12 is added with a value which is obtained by shifting (e.g., selecting by the selector 9) the value (CX (lower bits)+D) obtained by the processing at the address 7b to the lower bit side by 8 bits. Thus, the process at the address 7c performs a sum of products CX (upper bits) and CX (lower bits)+D.

In accordance with the process at an address 7d, as preparing for the next calculation, a value at an address 16 of the ROM 3 is loaded into the register 8, and also the addition of a value (CX (lower bits)+D) and a value (CX (upper bits)+D) obtained from the multiplier 7 by the processing at the address 7c is performed in parallel with the multiplication. Thus, the process at the address 7d performs a sum of product CX (upper bits)+CX (lower bits)+D to obtain a value CX+D which in turn is supplied to the accumulator 11.

Then, the above-described processings are sequentially repeated to obtain a value ((CX+D) X+1) by processing the an address 80, (((CX+D) X+1) X) by processing at an address 84, and (((CX+D) X+1) X+0) B+A=$Y_{SAW}$by processing at an address 89, and these values are sequentially supplied to the accumulator 11. Lastly, the value $Y_{SAW}$ is supplied to the output register 13 in accordance with the process at an address 8a.

The following table 2 shows an example of program lists for performing the calculation of the parabolic wave signal represented by the formula [$Y_{PARA}=(GX^4+X^2+HX)FB^2+E$] by the circuit arrangement of FIG. 1.

TABLE 2

| a | b | c | d | e | f | g | h |
|---|---|---|---|---|---|---|---|
| 5e | L | K > Y | Z + L = . | — | R | 0D | M |
| 5f | M | — > — | Z + R = . | A | — | 00 | O |
| 60 | M | — > — | Z + R = H | B | — | 18 | M |
| 61 | M | — > — | Z + B = . | A | — | 18 | M |
| 62 | L | K > Y | A + L = . | — | R | 02 | O |
| 63 | M | — > — | Z + R = H | A | — | 0D | L |
| 64 | M | — > — | A + B = H | B | — | 0D | M |
| 65 | M | — > — | A + B = . | A | — | 0D | M |
| 66 | L | K > Y | A + L = . | — | R | 17 | M |
| 67 | M | — > — | Z + R = H | A | — | 0D | L |
| 68 | M | — > — | A + B = H | B | — | 0D | M |
| 69 | M | — > — | A + B = . | A | — | 0D | M |
| 6a | L | K > Y | A + L = . | — | R | 00 | O |
| 6b | M | — > — | Z + R = H | A | — | 0D | L |
| 6c | M | — > — | Z + C = H | B | — | 0D | M |
| 6d | M | — > — | A + C = . | A | — | 0D | M |
| 6e | L | K > Y | A + M = . | — | R | 00 | O |
| 6f | M | — > — | Z + R = H | B | — | 04 | M |
| 70 | M | — > — | Z + B = . | A | — | 04 | M |
| 71 | L | K > Y | A + L = . | — | R | 00 | O |
| 72 | M | — > — | Z + R = H | B | — | 0F | M |
| 73 | M | — > — | Z + B = . | A | — | 0F | M |
| 74 | L | K > Y | A + L = . | — | R | 16 | M |
| 75 | M | — > — | Z + R = H | B | — | 0F | M |
| 76 | M | — > — | A + B = . | A | — | 0F | M |
| 77 | L | K > Y | A + L = . | — | R | 00 | O |
| 78 | L | X > Y | Z + L = . | A | 2 | 00 | M |

The calculation of the parabolic wave signal is performed by using the above table 2 in the same manner as in the case of the sawtooth wave signal.

Namely, a value GX+0 is obtained by processing at an address 61 of the I-ROM (I-RAM) 2, (GX) X+1 is obtained by the process at an address 65, ((GX) X+1) X+H is obtained by the process at an address 69, (((GX) X+1) X+H) X+0 is obtained by the process at an address 6d, (((GX) X+1) X+H) XF is obtained by the process at an address 70, (((GX) X+1) X+H) XFB is obtained by the process at an address 73, and (((GX) X+1) X+H) XFB$^2$+E=$Y_{PARA}$ is obtained by the process at an address 77. These values are sequentially supplied to the accumulator 11. Then, the value $Y_{PARA}$ is supplied to the output register 14 by processing at an address 78.

These processings are performed sequentially at every timing signal, whose frequency (2$f_H$) is, for example, twice that ($f_H$) of the horizontal sync. signal, on the basis of the count value X at the time.

Thus, according to the thus constituted correction signal generating circuit of the embodiment, since desired deflection distortion correction signals $Y_{SAW}$ and $Y_{PARA}$ based on the count value X can be obtained through a software processing such that the calculation utilizing a set of the multiplier 7 and the adder 10 is performed repeatedly, deflection distortion correction signals of various kinds of desired high order formulas can be obtained with simplified circuit configurations.

In the case of applying the circuit of FIG. 1 to a system such as a television receiver with a vertical sync. frequency of 60 Hz or 50 Hz, for example, the count value X counting the timing signal with the frequency (2$f_H$) of twice that ($f_H$) of the horizontal sync. signal changes from 0 to 525 and from 0 to 625 when the vertical sync. frequency is 60 Hz and 50 Hz as shown in FIGS. 2A, respectively. Now, the screen of one field displayed on a cathode ray tube is same in both of the cases where the vertical sync. frequencies are 60 Hz and 50 Hz. Further, values of the correction waveforms, for example, the sawtooth waveform and the parabolic waveform, correspond to absolute positions on the screen.

Figure 3:
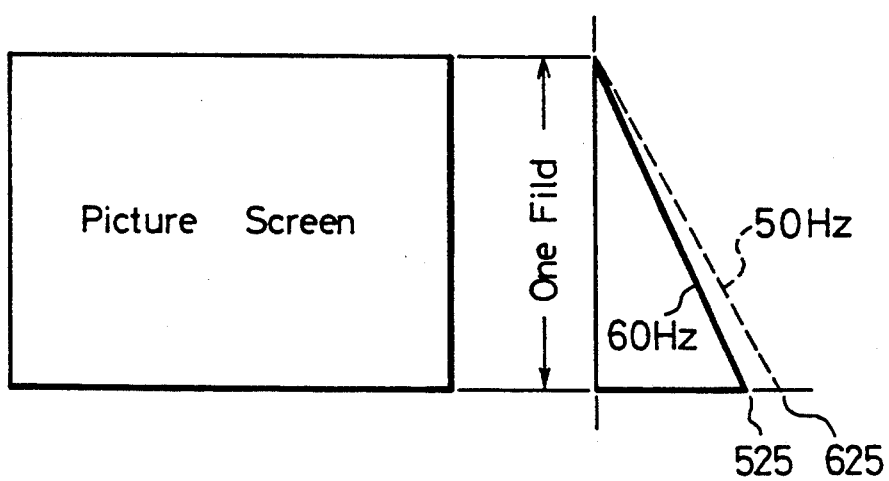
FIG. 3 is a schematic diagram showing a relation between a picture screen and a vertical sync. frequency used to explain the operation of the arrangement of FIG. 1.

Thus, when the count value X is compared with reference to the screen, the count values X in the cases where the vertical sync. frequencies are 60 Hz and 50 Hz can be related to the screen as shown by solid and broken lines in FIG. 3, respectively. As clear from FIG. 3, count values X of the respective cases are proportional to each other at the absolute positions of the screen. Thus, if the count value used in the above-described calculations is set as X* = K X, and this count value X* is in advance calculated in a manner that K is set to be 1 and 0.84 when the vertical sync. frequencies are 60 Hz and 50 Hz, respectively, an amount of distortion of an image with respect to the absolute positions on the screen becomes constant irrespective of the kinds of the systems. In this case, it becomes unnecessary to change parameters or the like for every system. Now, the calculation of X* = K X may be performed by the multiplier 7.

As set out above, according to this invention, since a desired correction signal based on the count value can be obtained through a software processing such that the calculation utilizing a set of the multiplier and the adder is performed repeatedly, the distortion correction signals of various kinds of desired high order formulas can be obtained with simplified circuit configurations.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is:

1. A correction signal generating circuit for a television receiver, said circuit comprising:
    instruction address generating means for generating addresses in response to pulses synchronized with a horizontal sync signal;
    random access memory means for storing a correction signal and a coefficient and connected to receive said addresses and a count value based on said pulses synchronized with a horizontal sync signal;
    means for multiplying and adding contents of said memory means read out in response to said addresses and fed to a first input;
    a signal feedback loop for supplying an output from said means for multiplying and adding to a second input of said means for multiplying and adding; and
    control means for controlling operation of said memory means and said means for multiplying and adding, so that said means for multiplying and adding generate said correction signal.

2. A correction signal generating circuit according to claim 1 wherein the correction signal is a parabolic wave signal having a period equal to that of a vertical sync. signal.

3. A correction signal generating circuit according to claim 1 wherein said signal feedback loop comprises a bus line.

* * * * *